Sept. 17, 1940.    C. H. BOCK    2,214,951

FLUID PRESSURE ACTUATED BRAKE

Original Filed Oct. 8, 1937

INVENTOR.
CLARENCE H. BOCK
BY
ATTORNEY.

Patented Sept. 17, 1940

2,214,951

UNITED STATES PATENT OFFICE 2,214,951

FLUID PRESSURE ACTUATED BRAKE

Clarence H. Bock, Royal Oak, Mich., assignor to Hydraulic Brake Company, Detroit, Mich., a corporation of California Original application October 8, 1937, Serial No. 167,921, now Patent No. 2,188,453, dated January 30, 1940. Divided and this application August 29, 1938, Serial No. 227,408

8 Claims. (Cl. 188—152)

This invention relates to brakes for motor vehicles.

It is well established that in brake structures of the internal expansible type, prolonged braking applications result in generation of intense heat and consequent expansion of the drum. This expansion of the drum does not take place uniformly. To the contrary, because of the characteristics of the material from which drums are manufactured, the expansion is non-uniform, hence the drum goes out of round. This condition is intensified due to the greater braking effectiveness of the forward braking shoe than that of the trailing braking shoe, the drum gradually yielding to the pressure applied by the forward braking shoe. The present invention aims to overcome this objection.

Broadly the invention comprehends a brake having fluid pressure means for actuating the friction elements of the brake. In a preferred embodiment of the invention, a fluid pressure actuated motor for moving the friction elements of the brake into engagement with a drum includes means for inhibiting retrograde movement of the fluid in the motor so as to retain one of the shoes against movement toward its retracted position during a braking operation.

An object of the invention is to provide a fluid pressure actuated motor having means inhibiting retrograde movement of the fluid in the motor during energizing thereof.

Another object of the invention is to provide a fluid pressure actuated motor for moving the shoes of a brake into engagement with a drum, having means for controlling the shoes so as to resist distortion of the drum during a braking operation.

Figure 1:
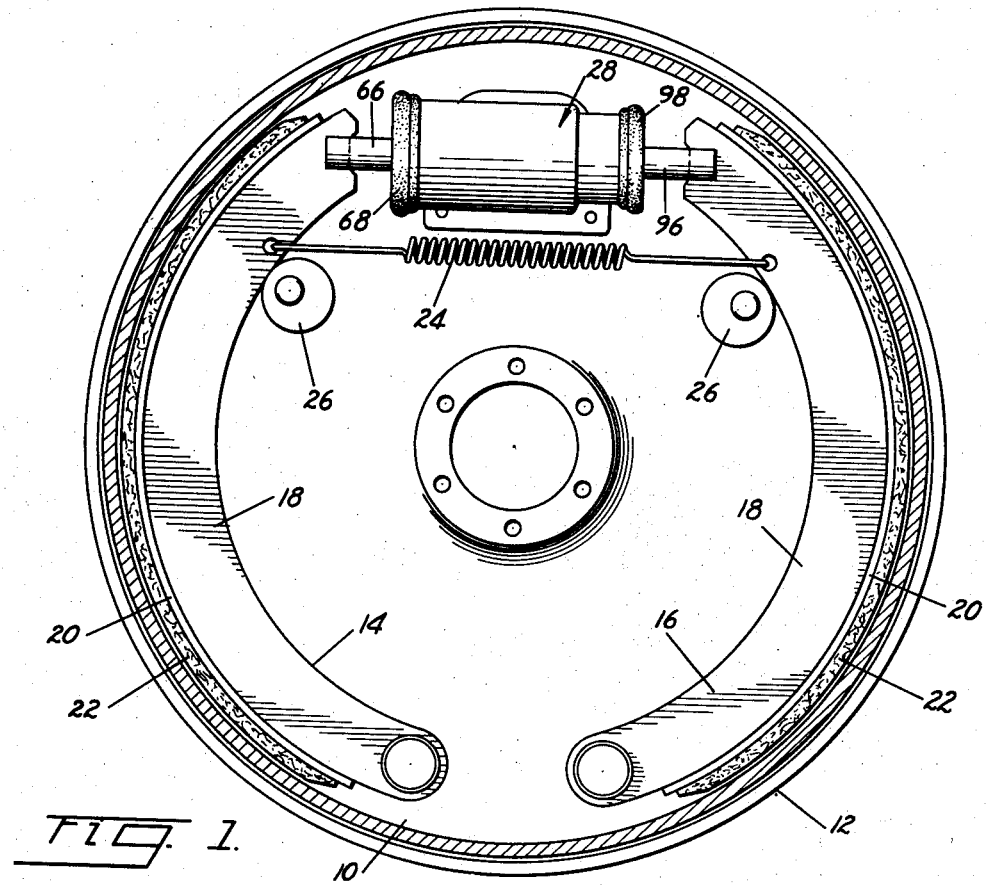
Figure 2:
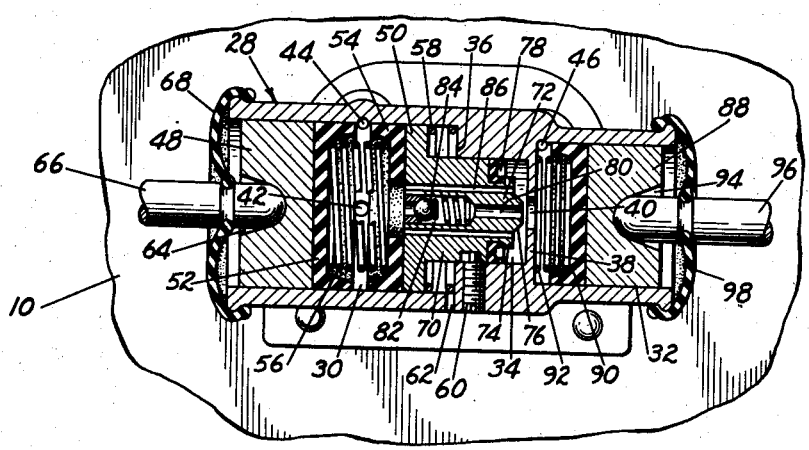

Other objects and advantages of the invention will appear from the following description taken in connection with the drawing forming a part of this specification, and in which, Fig. 1 is a vertical sectional view of a brake embodying the invention; and Fig. 2 is a longitudinal sectional view of a motor for actuating the brake.

Referring to the drawing for more specific details of the invention, 10 represents a fixed support or backing plate adapted to be secured to an axel or to an axle housing. The backing plate has associated therewith a rotatable drum 12 adapted to be secured to a wheel, and a pair of corresponding interchangeable friction elements or braking shoes 14 and 16 are pivotally mounted on the backing plate for cooperation with the drum.

The shoe 14 is a forward braking shoe, and the shoe 16 is a trailing braking shoe. Each of the shoes includes a web 18 supporting a rim 20 having secured thereto a suitable lining 22 for frictionally engaging the drum, and a retractile spring 24 connects the shoes. This spring serves to return the shoes from applied position to retracted or off position, and to retain the shoes when in retracted position against conventional stops 26, suitably arranged on the backing plate, where the shoes are supported in proper spaced relation to the drum.

The actuator for the friction elements or shoes includes a fluid pressure actuated motor 28 mounted on the backing plate between and connected to the separable ends of the shoes 14 and 16. The motor comprises a cylinder having a large chamber 30, a relatively small chamber 32, and an intermediate chamber 34, all arranged concentrically to and in communication with one another.

One end of the intermediate chamber 34 opens directly into the large chamber 30, and at the junction of the large and intermediate chambers is an annular shoulder 36. The other end of the intermediate chamber is closed as by a head 38 having an axial port 40 providing a communication between the intermediate and the small chambers.

The large chamber 30 has a port 42 connected as by a conventional fluid pressure delivery tube, not shown, to a suitable source of fluid including a fluid pressure producing device. The chamber 30 also has a port 44 normally closed as by a conventional bleeder screw, and, correspondingly, the small chamber 32 has a port 46 also normally closed as by a conventional bleeder screw.

Oppositely disposed pistons 38 and 50 reciprocable in the large chamber 30 have upon their respective heads sealing cups 52 and 54, one of which, the cup 54, has an axial opening; and a spring 56 interposed between the cups serves to retain the cups against displacement and also to retain the pistons in proper spaced relation to one another when the pistons are in retracted position. A spring 58 interposed between the back of the piston 50 and the annular shoulder 36 normally urges the piston 50 against a stop 60 mounted in the wall of the cylinder, and arranged in the wall of the cylinder adjacent the annular shoulder is an air vent 62.

The piston 48 has in its back a recess 64 for the reception of one end of a thrust pin 66, and the other end of the thrust pin is suitably connected to the forward brake shoe 14. A shield 68 sleeved on the thrust pin 66 embraces the open end of the large chamber 30 for the exclusion of dust and other foreign substances from the chamber.

The piston 50 has a concentric extension 70 movable in the intermediate chamber 34, and this extension has a reduced end portion 72 provided with circumferential flange 74 and a frustroconical end 76 adapted to enter and close the port 40. A sealing cup 78 sleeved on the reduced portion 72 and seated on the extension 70 is held against displacement by the flange 74. The piston 50 has an axial passage 80 extending therethrough and in this passage is a valve chamber 82 having therein a spring-pressed ball valve 84 for controlling the passage. The piston also has a plurality of spaced passages 86 extending therethrough.

A piston 88 reciprocable in the small chamber 32 has on its head a sealing cup 90, and a spring 92 interposed between the cup and the head 38 serves to retain the cup against displacement and also to retain the piston in proper spaced relation to the head 38 when the piston is in its retracted position. The piston 88 also has in its back a recess 94 for the reception of one end of the thrust pin 96, and the other end of the thrust pin 96 is suitably connected to the trailing brake shoe 16. A shield 98 sleeved on the thrust pin 96 embraces the open end of the chamber 32 for the exclusion of dust and other foreign substances from the chamber.

In the normal operation, upon energization of the fluid pressure actuated motor 28, fluid under pressure entering the large chamber 30 causes movement of the piston 48 on its compression stroke, resulting in actuation of the forward braking shoe 14, and, simultaneously with this operation, fluid is displaced from the chamber 30 through the passages 86 in the piston 50 into the intermediate chamber 34, thence through the port 40 into the small chamber 32, causing movement of the piston 88 on its compression stroke, resulting in actuation of the trailing brake shoe 16.

As the pistons 48 and 88 move on their compression strokes, the piston 50 also moves against the resistance of the spring 58 and seats the conical end 76 on the extension 70 of the piston 50 in the port 40 so as to close the port, and, thereafter, as the pressure on the fluid in the large chamber 30 increases or builds up, fluid is displaced from the large chamber through the passage 80, past the valve 84 in the piston 50, into the small chamber 32.

Under these conditions, should the drum expand, due to heat generated in a braking operation, the fluid in the small chamber 32 becomes trapped and maintains a constant pressure in the small chamber, tending to retain the piston 88 against movement. This results in retaining the trailing shoe 16 against movement toward its retracted position, and, accordingly, checks distortion of the drum.

This application is a division of my pending application, Serial No. 167,921, filed October 8, 1937, now Patent 2,188,453, January 30, 1940, and is made in accordance with requirements of the United States Patent Office under the provision of Rule 42.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising a rotatable drum, a pair of braking shoes for cooperation therewith, and a fluid pressure actuated motor for activating the shoes including a cylinder and opposed pistons movable in the cylinder and means in the motor for control of fluid flow to inhibit retrograde movement of one of the pistons so as to hold the shoe activated thereby against movement.

2. A brake comprising a fixed support, a rotatable drum associated therewith, a pair of braking shoes pivoted on the support for cooperation with the drum, and a fluid pressure actuated motor for activating the shoes including a cylinder, opposed pistons movable in the cylinder, and means in the cylinder between the pistons for holding one of the pistons against retrograde movement during energization of the motor so as to retain one of the shoes against movement.

3. A brake comprising a fluid pressure actuated motor including a cylinder and opposed pistons movable in the cylinder, friction elements connected to the pistons, and means in the cylinder between the pistons for trapping fluid to retain one of the pistons against retrograde movement so as to inhibit movement of the friction element connected thereto.

4. A brake comprising a fixed support, a rotatable drum associated therewith, a forward braking shoe mounted on the backing plate for cooperation with the drum, a trailing braking shoe mounted on the backing plate for cooperation with the drum, a fluid pressure actuated motor mounted on the backing plate including a cylinder and opposed pistons therein connected respectively to the forward and trailing shoes, and means in the motor between the pistons for trapping fluid so as to inhibit retrograde movement of the piston connected to the trailing shoe whereby the trailing shoe is held against movement.

5. A brake comprising a fluid pressure actuated motor including a cylinder, opposed pistons reciprocable in the respective ends of the cylinder, a piston reciprocable in the cylinder intermediate the pistons in the ends of the cylinder, means for by-passing fluid through the intermediate piston, and means for trapping the fluid between the intermediate piston and the piston in one of the ends of the cylinder.

6. A brake comprising a fluid pressure actuated motor including a cylinder having a large chamber and a small chamber and a chamber intermediate the large and small chambers, a piston movable in each of the chambers, means for by-passing fluid through the piston in the intermediate chamber, and means for trapping fluid between the piston in the intermediate chamber and the piston in the small chamber.

7. A brake comprising a fluid pressure actuated motor including a cylinder having a large chamber, a small chamber, and a chamber intermediate the large and small chambers opening into the large chamber and provided with a port communicating with the small chamber, a piston movable in each of the chambers, means for by-passing fluid through the piston in the intermediate chamber, and means carried by the piston in the intermediate chamber for controlling the port.

8. A brake comprising a fluid pressure actuated motor including a cylinder having a large chamber, a small chamber, and a chamber intermediate the large and small chambers opening directly into the large chamber and having a port providing a communication between the intermediate chamber and the small chamber, oppositely arranged pistons movable in the large and small chambers, a piston movable in the large chamber having a part reciprocable in the intermediate chamber and another part adapted to enter the port, means for by-passing fluid through the piston in the intermediate chamber, and means carried by the piston in the intermediate chamber for controlling the port.

CLARENCE H. BOCK.